Patented Nov. 29, 1938

2,138,582

UNITED STATES PATENT OFFICE 2,138,582

RECOVERY OF LOWER ALIPHATIC ACIDS

Paul Knapp, Waynesboro, Va., assignor to E. I. du Pont de Nemours & Company, Wilmington, Del., a corporation of Delaware No Drawing. Application November 11, 1936, Serial No. 110,406

2 Claims. (Cl. 260—541)

This invention relates to a process of recovering lower aliphatic acids from aqueous solutions thereof containing dissolved and/or suspended cellulose derivatives. More particularly, it relates to a process of converting such dissolved and/or suspended cellulose derivatives with rapidity and certainty into water-soluble compounds that cannot be further hydrolyzed to a water-insoluble stage. The invention will be described in terms of the recovery of acetic acid from aqueous solutions thereof containing dissolved and/or suspended cellulose acetate, although it is to be understood that it is not to be limited thereto.

In the manufacture of cellulose acetate, cellulosic material is usually treated with an acetylating mixture comprising acetic anhydride, acetic acid, and a catalyst. After completion of the acetylation, the cellulose triacetate is usually partially hydrolyzed to an acetone-soluble cellulose acetate which is precipitated with water and separated from the dilute acetic acid liquid by filtration or the like. The dilute acetic acid filtrate, however, retains in solution and/or in colloidal suspension a certain amount of cellulose acetate hydrolyzed to a greater extent than the precipitated material and of little commercial use. In addition, due to the imperfection of the filtering medium, or agglomeration of colloidal particles after filtration, a certain quantity of larger sized particles are present. In order to facilitate the recovery and reuse of the acetic acid, which is a valuable product, this filtrate may be put through a second filtration in an endeavor to remove as completely as possible the suspended material, after which the acetic acid is directly extracted with a water-immiscible solvent. However, a considerable quantity of suspended and/or dissolved cellulose acetate is still present after the second filtration, and this is precipitated from the solution as the acetic acid is extracted from the aqueous layer. The precipitated cellulose acetate, particularly at the interface of the water and solvent layers, tends to become emulsified and impedes the separation and decantation of the layers to such an extent that the extraction process is rendered technically useless.

In order to overcome these difficulties, it has been proposed to preliminarily heat the dilute acetic acid solution with a small amount of strong acid such as sulfuric acid, in order to convert the suspended material into water soluble materials, as disclosed and claimed in U. S. Letters Patent to Prince, No. 1,898,213. While it definitely facilitates the extraction of acetic acid from dilute solutions thereof, the Prince procedure has suffered the disadvantage of being relatively time consuming. Since comparatively large quantities of dilute acetic acid result from the preparation of cellulose acetate, the relatively large amount of time involved by the Prince method of pretreatment requires the use of a considerable number of large storage tanks, and results in unavoidable loss of some acetic acid by volatilization during storage.

It is, therefore, an object of the present invention to rapidly and completely convert cellulose derivatives dissolved and/or suspended in dilute lower aliphatic acid solutions into water-soluble substances that cannot be further hydrolyzed to water insolubility.

It is another object to rapidly and completely convert cellulose acetate dissolved and/or suspended in dilute acetic acid solution into water-soluble substances that cannot be further hydrolyzed to water insolubility.

It is also an object of the present invention to furnish a pretreatment which eliminates the necessity for partially removing suspended material by filtration.

It is also an object of the invention to convert cellulose derivatives to water-soluble products in the absence of any sulfuric acid other than that employed as an hydrolysis catalyst, and even in the substantially complete absence of sulfuric acid or similar corrosive hydrolysis catalyst.

It is a further object to conduct the conversion of cellulose derivatives to water-soluble products in a continuous manner.

It is another object to extract acetic acid from dilute solutions thereof without precipitation of cellulosic material at the interface of the solvent and water layers.

It is a further object of the present invention to conduct the extraction of acetic acid from solutions thereof without substantially clogging the extraction column.

It is a still further object to extract the acetic acid from aqueous solutions thereof in a decidedly rapid and economical manner.

Other objects will appear hereinafter.

These objects are accomplished, in general, by heating the dilute lower aliphatic acid solution, particularly acetic acid solution, containing dissolved and/or suspended cellulose derivatives, for a relatively short period of time at a temperature above the normal atmospheric boiling point of the liquid, generally at a temperature of above 130° C., such as 160–200° C., and preferably at a pressure sufficient to keep the solution in the liquid phase, whereby the cellulose derivatives are converted substantially completely into water-soluble substances such as sugars that cannot be further hydrolyzed to water insolubility.

In the preferred embodiment of the invention, preheated dilute aqueous acetic acid, containing dissolved and/or suspended cellulose acetate, is heated for a period of approximately 2 to 15 minutes at a temperature of 160–200° C. and preferably at pressures at which the weak acid solution is maintained substantially in the liquid phase. The cellulosic derivatives are apparently directly converted to water-soluble sugars or derivatives thereof without noticeable intermediate or subsequent formation of water-insoluble cellulose derivatives or regenerated cellulose. The dilute acetic acid solution, pretreated in this manner, is extracted countercurrently with ether or like solvents in a suitable extraction column. The ether layer speedily separates and, after decantation from the water layer, is fractionally distilled. The concentrated acetic acid, thus obtained, is converted into glacial acetic acid by rectification.

The following examples are given as illustrative of the invention, but it will be understood they are in no wise to be considered limitative:

*Example 1*

Cellulosic material is acetylated in the usual manner with a mixture of acetic anhydride, acetic acid, and a small amount of sulfuric acid. The primary cellulose triacetate is hydrolyzed in the customary manner to the desired acetyl content and is precipitated in water. The precipitated cellulose acetate is filtered from the liquid to yield a filtrate containing approximately 20-30%, or more, acetic acid, a small percentage of dissolved and suspended cellulose acetate, and 0.1 to 1% of sulfuric acid. The filtrate at a temperature of approximately 18° C. is conducted into a heat exchanger wherein it is heated to a temperature of 65° C. and then is flowed through a closed dwelling chamber of suitable length where it is maintained for a period of 3 to 7 minutes at a temperature of 175° C. and a pressure sufficient to maintain the weak acid substantially in the liquid phase. This treatment causes the cellulose derivatives dissolved and/or suspended in the liquid to become completely hydrolyzed to water-soluble substances. The treated liquid is passed through a regulating valve into a flash tank which is kept at atmospheric pressure or under a slight vacuum. Since the customary filtration prior to hydrolysis is not performed, a period slightly longer than 3-7 minutes may be required in exceptional cases for complete conversion to water solubility of unusually large sized cellulose derivative particles.

The liquid is next cooled to 35° C. by passage through the above-mentioned heat exchanger, and then cooled to a temperature satisfactory for extraction purposes by passage through a cooler. The clear liquid is then freed of oxygen according to the method described in U. S. Letters Patent to Grillet No. 1,870,953 and finally is flowed into the top of an ether extraction column while ether is led in from the bottom. The countercurrent ether extraction is performed quite rapidly since there is no precipitation of insoluble material at the ether-water interface, and the ether-water emulsion therefore separates without any noticeable delay. The ethereal layer is separated from the water layer, the ether distilled off, and the acetic acid rectified to glacial acid in the customary manner.

*Example 2*

Cellulosic material is acetylated in the usual manner with a mixture of acetic anhydride, acetic acid, and a small amount of sulfuric acid. The primary cellulose triacetate is hydrolyzed in the customary manner to the desired acetyl content and is precipitated in water. The precipitated cellulose acetate is filtered from the liquid to yield a filtrate containing approximately 20-30%, or more, acetic acid, a small percentage of dissolved and suspended cellulose acetate, and 0.1 to 1% of sulfuric acid. The filtrate is treated with sodium acetate, sodium carbonate, or the like until the 0.1 to 1% of sulfuric acid has been completely neutralized. The treated liquid is conveyed to a heat exchanger in which it is heated to a temperature of 150° C. and then is passed through a closed dwelling chamber of suitable length, which is maintained at a temperature of 190° C. and preferably at a pressure at which the weak acid is maintained substantially in the liquid phase for a period of 3-5 minutes. The treatment converts all the cullulose derivatives to water-soluble substances such as sugars apparently without any overhydrolysis to water-insoluble cellulose acetate or regenerated cellulose. The resulting clear liquid is cooled to 60° C. by passage through a heat exchanger and is then flashed into a chamber which is maintained at atmospheric pressure or under a slight vacuum. The liquid is cooled to room temperature, countercurrently extracted with ether, separated, fractionally distilled and rectified in the same manner as in Example 1.

*Example 3*

The filtrate, resulting from the precipitation of cellulose acetopropionate in water or an aqueous acid solution, and containing 20-30% of mixed acetic and propionic acids, and dissolved or colloidally suspended cellulose acetopropionate, is heated to a temperature of 150° C. by passage through a heat exchanger. The liquid is next conveyed to a closed dwelling chamber in which it is maintained at a temperature of 190° C. and preferably at a pressure at which the weak acid is maintained substantially in the liquid phase during its passage therethrough, which takes approximately 3-5 minutes. The clear liquid, in which the cellulose acetopropionate has now been converted to water-soluble substances such as sugars, is cooled to 60° C. by passage through a heat exchanger, and is flashed into a chamber which is at atmospheric temperature and pressure. The clear liquid is further cooled to a temperature of 20-25° C., after which it is countercurrently extracted with ether, the ether distilled off, and the residue of concentrated mixed acid rectified in the same manner as in Example 1.

It will be apparent to the skilled technician that the present invention is susceptible to many adaptations and changes without departure from the basic principles of the invention. Thus the cellulose derivatives present in the aqueous acid solution to be treated by the invention need not be cellulose acetate but may be cellulose propionate, cellulose butyrate, cellulose acetobutyrate, and like cellulose simple and mixed esters of lower aliphatic acids. The acid to be recovered will, of course, depend upon the cellulose derivatives being manufactured; thus instead of acetic acid, propionic acid will be recovered in the case of cellulose propionate, butyric in the case of cellulose butyrate, acetic and butyric acids in the case of cellulose acetobutyrate, etc.

The temperature of the treatment may be varied considerably as long as the normal atmospheric boiling point of the liquid is exceeded. Depending on the composition of the liquid, both as to concentration and kind of acid, the boiling point of the liquid is approximately 101-110° C. The pressure generated in the closed chamber varies, of course, with the temperature employed, but it is always maintained above atmospheric pressure, and preferably is sufficiently high to maintain the fluid in the liquid phase. The pressure generated in the chamber may also be supplemented with the pressure of an inert gas such as nitrogen.

The time required for conversion of the cellulose derivatives to water-soluble compounds is generally only a matter of minutes. Thus at a high temperature of 190° C. or more and at a pressure at which the weak acid is maintained substantially in the liquid phase, the reaction proceeds to completion in approximately 2-4 minutes. At lower temperatures and pressures, the time required is somewhat longer.

A strong acid catalyst, such as sulfuric acid, may or may not be present. Normally, there is present a small percentage of sulfuric acid or the like in the aqueous acid solution carried over from the preparation of the cellulose derivatives. If desired, this sulfuric acid may be neutralized so that none is present in the liquid to be treated, and generally this procedure is to be preferred if the hydrolysis is to be performed at a temperature of 190° C. or higher. If the hydrolysis is to be conducted at lower temperatures approaching the boiling point of the liquid mixture, additional sulfuric acid in amounts up to 1% may be added. However, this latter procedure is generally to be avoided, both because of the greater length of time required for treatment and the corrosive nature of sulfuric acid.

Generally it is preferred to conduct the conversion to water-soluble substances in a continuous manner, as illustrated in the above examples. It is possible to do this because of the relatively short length of time required. The economic advantages of a continuous process are of course well known. Occasionally, however, such as when operating on a small scale, it may be desired to operate by the batch method.

The solvent extraction of the acetic or other acid may be performed with other suitable water-immiscible liquids instead of diethyl ether. Thus isopropyl ether is a decidedly good solvent for this purpose. Propyl acetate, butyl acetate, amyl acetate, methyl isopropyl ketone, propylene chloride, ethylene chloride, methylene chloride, isopropyl iodide, and the like may also be utilized.

The pretreatment of the dilute acetic acid particularly facilitates acid concentration processes that are characterized by the steps of extraction, decantation, and fractional distillation. However, the pretreatment may also be applied with some advantage to a concentration procedure characterized by azeotropic distillation. Thus, for instance, the pretreated dilute aqueous acetic acid may be vaporized and led into a plate column still at a point approximately one-third the way up the column in which ethylene chloride or the like is introduced from the top. The vapors issuing from the column and consisting of ethylene chloride and water are condensed, separated, and the ethylene chloride recirculated to the top of the column. The acetic acid concentrates in the kettle of the still column and is withdrawn when it has reached a concentration of approximately 99 to 99.5%.

In so far as known, the present invention offers a pretreatment process superior to any other for recovering acid from dilute aqueous solutions contaminated with cellulose derivatives. The pretreatment can be performed on dilute acid containing suspended cellulose derivative particles, thereby eliminating the necessity for the customary filtration step, and it normally can be completed within a few minutes, both of which are distinct operating and economic advantages. The process may also be continuous, which offers a considerable improvement over intermittent batch operation. The liquid obtained by the treatment of the invention is clear, contains no cellulose derivatives, but only water-soluble compounds such as sugars and derivatives thereof, which cannot be overhydrolyzed into water-insoluble products. In consequence, there is no precipitation of insoluble material at the interface of the water and solvent layers and no tendency for a permanent emulsion to be formed which impedes the rapid and clear-cut separation or decantation of the solvent layer. The clear-cut separation into two distinct layers naturally tends to reduce acid losses since the water layer is customarily discarded into the sewer. The complete elimination of cellulose derivatives from the treated liquid also insures that no substantial accumulation of solid material occurs in the extraction column which in turn eliminates the necessity of cleaning this equipment at frequent intervals.

As the invention is capable of being modified within wide limits, any embodiment which conforms to the spirit of the invention is intended to be included within the scope of the claims.

I claim:

1. The process of treating dilute aqueous acetic acid solution containing dissolved and/or suspended cellulose compounds remaining and resulting from the manufacture of cellulose acetate, and free sulfuric acid, which comprises neutralizing the sulfuric acid, heating said solution to a temperature between 160° and 200° C. and at a pressure sufficient to maintain the solution in the liquid phase, maintaining said temperature and pressure for a period of two to fifteen minutes and until said cellulose compounds are substantially completely converted to water-soluble substances incapable of further hydrolysis to water-insoluble substances, reducing the pressure and cooling the solution so treated, and extracting the acetic acid.

2. The process of treating dilute aqueous acetic acid solution containing dissolved and/or suspended cellulose compounds remaining and resulting from the manufacture of cellulose acetate, and in excess of 1.0% of free sulfuric acid, which comprises neutralizing such an amount of the free sulfuric acid as will reduce the same to a concentration of between 0.1% and 1.0%, heating said solution to a temperature between 160° C. and 200° C. and at a pressure sufficient to maintain the solution in the liquid phase, maintaining said temperature and pressure for a period of two to fifteen minutes and until said cellulose compounds are substantially completely converted to water-soluble substances incapable of further hydrolysis to water-insoluble substances, reducing the pressure and cooling the solution so treated, and extracting the acetic acid.

PAUL KNAPP.